Patented Dec. 15, 1953

2,662,883

UNITED STATES PATENT OFFICE 2,662,883

PROCESS FOR PREPARATION OF N-GLYCO-SIDES OF 5,6 DIMETHYL BENZIMIDAZ-OLES

Frederick W. Holly, Cranford, Clifford H. Shunk, Westfield, and Karl Folkers, Plainfield, N. J., assignors to Merck & Co., Inc., Rahway, N. J., a corporation of New Jersey No Drawing. Application May 3, 1950, Serial No. 159,878

5 Claims. (Cl. 260—211.5)

This invention relates to the preparation of chemical compounds having growth-stimulating or vitamin-like activity and, more particularly, to the preparation of N-glycosides of 5,6-dimethylbenzimidazole which may be represented by the following formula:

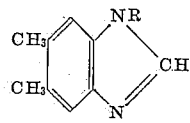

wherein R is a glycosido radical having at least 4 carbon atoms. These compounds are characterized by a glycosidic linkage of the type:

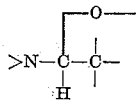

as expressed by the generic name of N-glycosides.

In our pending application Serial No. 124,236, filed October 28, 1949, now Patent No. 2,644,817, we have originally disclosed and claimed these N-glycosides of 5,6-dimethylbenzimidazole and certain procedures for their preparation. The disclosed procedure involves reacting an aldosugar with 2-nitro-4,5-dimethylaniline to form an N-glycosido compound which is hydrogenated and converted to an N-glycoside of 5,6-dimethylbenzimidazole by reaction with formic acid or certain derivatives thereof.

We have now discovered that the N-glycosides of 5,6-dimethylbenzimidazole can also be prepared by reacting a silver salt of 5,6-dimethylbenzimidazole with an acylated halosugar.

The silver salt of 5,6-dimethylbenzimidazole may be prepared by reacting 5,6-dimethylbenzimidazole with an inorganic silver salt such as silver nitrate, in an aqueous alkaline solution. The 5,6-dimethylbenzimidazole may in turn be prepared by condensing 4,5-diamino-1,2-dimethylbenzene with formic acid as described by Brink and Folkers, J. Amer. Chem. Soc., 71, 2951 (1949).

The acylated halosugars which are particularly desirable for this reaction are those having at least 4 carbon atoms and a halogen atom in the 1 position; these compounds may be prepared by various known methods such as, for example, by acylating an aldosugar and treating the resulting acylated product with hydrogen chloride.

In carrying out the process of the present invention the silver salt of 5,6-dimethylbenzimidazole is first suspended in an inert organic liquid. Suitable organic liquids include solvents such as benzene, xylene, toluene, and the like. An acylated halosugar is then added to the suspension and the reaction mixture is heated under reflux for a short period of time. After completion of the reaction the mixture is cooled and filtered. The organic liquid is then evaporated from the reaction mixture yielding an acylated N-glycoside as a crude residue. The acylated N-glycoside is then deacylated, and the resulting product is treated with aqueous picric acid to precipitate crystals of N-glycoside of 5,6-dimethylbenzimidazole.

The deacylation of these compounds may be accomplished by heating the acylated compound in an alcoholic solution in the presence of an alkali metal alcoholate. We have obtained excellent results with the use of sodium methoxide. Alternatively, the acylated compound is deacylated by heating with an aqueous mineral acid.

By use of the appropriate acylated halosugar our process is applicable to synthesis of any one of the 4 isomers derived from any given carbohydrate; it is applicable to the synthesis of the α- and β- forms of the furanose and pyranose ring systems.

The conversion of the picrates to the free bases may be accomplished by conventional methods such as continuous chloroform extraction of an alkaline solution of the picrates which yields a chloroform extract containing the glycoside.

The N - glycoside - 5,6 - dimethylbenzimidazole prepared in accordance with our invention possess the animal protein factor activity to an appreciable extent and may be used to replace vitamin $B_{12}$ for certain purposes.

The following examples illustrate methods of carrying out the present invention, but it is to be understood that these examples are given by way of illustration and not of limitation.

EXAMPLE 1

Preparation of 5,6-dimethylbenzimidazole silver salt

To a solution of 1.5 parts of 5,6-dimethylbenzimidazole in 200 parts of warm 6 N ammonium hydroxide and 20 parts of ethanol was added a solution of 1.9 parts of silver nitrate in 10 parts of water. The mixture was chilled and the precipitate was collected on a filter and washed with cold dilute aqueous ammonia; 2.5 parts of 5,6-dimethylbenzimidazole silver salt was obtained as a white solid.

EXAMPLE 2

*Preparation of 1-L-arabinopyranosido-5,6-dimethylbenzimidazole*

One part of the silver salt of 5,6-dimethylbenzimidazole was suspended in 30 parts of xylene containing 1.3 parts of 1-bromo-2,3,4-triacetyl-L-arabinose, and the mixture was refluxed for ten minutes. After cooling and filtering, the solvent was evaporated under reduced pressure giving 1 - L - triacetylarabinosido - 5,6 - dimethylbenzimidazole as an oil.

EXAMPLE 3

*Deacetylation with sodium methoxide*

The triacetylarabinosido-5,6-dimethylbenzimidazole was dissolved in 50 parts of absolute ethanol, and 0.19 part of sodium methoxide were added. After the solution was refluxed for one hour, it was evaporated under reduced pressure and the residue was partitioned between chloroform and water. After extraction of the aqueous layer with chloroform, it was neutralized with dilute hydrochloric acid and excess aqueous picric acid was added. The precipitate which separated was collected, washed with water, and dissolved in hot ethanol. Yellow prisms separated slowly as the solution cooled. Recrystallization from 15 parts of ethanol gave yellow platelets of 1-L-arabinopyranosido-5,6-dimethylbenzimidazole picrate. The compound was a pyranoside since 1.8 moles of periodate were consumed in a forty-seven hour period.

*Anal.*—Calcd. for $C_{20}H_{21}N_5O_{11}$: C, 47.34; H, 4.17; N, 13.80. Found: C, 47.67; H, 3.92; N, 14.09.

EXAMPLE 4

*Deacetylation with mineral acid*

The triacetylarabinosido - 5,6 - dimethylbenzimidazole was dissolved in 10 parts of ethanol; 20 parts of water and 3 parts of concentrated hydrochloric acid were added. After the solution was refluxed for two hours, it was evaporated under reduced pressure to one-half volume and made alkaline with dilute sodium hydroxide. The mixture was extracted with three portions of chloroform and then made slightly acid with dilute hydrochloric acid. The addition of aqueous picric acid gave a precipitate which was collected and dried under reduced pressure giving yellow crystals that were recrystallized from methanol yielding 1-L-arabiopyranosido-5,6-dimethylbenzimidazole picrate.

EXAMPLE 5

*Preparation of 1-β-D-glucopyranosido-5,6-dimethylbenzimidazole*

To a suspension of 1.5 parts of 5,6-dimethylbenzimidazole silver salt in 100 parts of dry xylene, 2.4 parts of acetobromoglucose was added and the mixture was refluxed for 2 hours. The mixture was filtered, the solid was washed with xylene, and the filtrate was concentrated in vacuo to a solid which was hydrolyzed with 50 parts of 5% hydrochloric acid containing 10 parts of ethanol, by refluxing for 2 hours. The solution was cooled, adjusted to pH 9 with sodium hydroxide solution, extracted three times with chloroform, adjusted to pH 2 with hydrochloric acid, and extracted again with chloroform. A clear solution was obtained, to which an aqueous solution of picric acid was added to isolate the glucoside conveniently as a picrate. The yellow crystalline product was recrystallized from ethanol-water to give 1-β-D-glucopyranosido-5,6-dimethylbenzimidazole picrate.

*Anal.*—Calcd. for $C_{21}H_{23}N_5O_{12}$: N, 13.03, Combining weight, 308. Found: N, 13.16; Combining weight, 293.

EXAMPLE 6

*Preparation of 1-L-arabinofuranosido-5,6-dimethylbenzimidazole*

L-arabinose was tritylated by the usual procedure and the oily 5-trityl-L-arabinose was acetylated in pyridine and acetic anhydride at 0° C. The oily 1,2,3-triacetyl-5-trityl-L-arabinose was hydrogenated in methanol over palladium-Darco (5% palladium), to yield triacetyl-L-arabinofuranose which was reacetylated in pyridine and acetic anhydride at 0° C. The resulting tetraacetyl-L-arabinofuranose was dissolved in ether saturated with hydrogen chloride and the solution was kept at 0° C. for twenty hours. The solvent was removed by evaporation in vacuo and the oily residue containing 1-chlorotriacetyl-L-arabinofuranose was refluxed with 2 parts of 5,6-dimethylbenzimidazole silver salt in 50 parts of xylene for five hours. The mixture was filtered and the filtrate was concentrated in vacuo to an oil containing crystals of triphenylchloromethane. The mixture of oil and crystals was refluxed for 2 hours with 5% hydrochloric acid containing sufficient ethanol to dissolve the products. The solids which separated were removed by filtration, the filtrate was concentrated in vacuo, the residue was dissolved in water and the solution was adjusted to pH 9 with sodium hydroxide and extracted three times with chloroform. After the aqueous layer was adjusted to pH 2 with hydrochloric acid, an aqueous solution of picric acid was added. The picrate obtained was recrystallized from water-methanol giving 1-L-arabinofuranosido-5,6-dimethylbenzimidazole picrate.

Various changes and modifications in the foregoing procedure will occur to those versed in the art, and to the extent that such changes and modifications fall within the purview of the appended claims it will be understood that they constitute part of our invention.

We claim:

1. The process for preparing N-glycosides of 5,6-dimethylbenzimidazole having the formula:

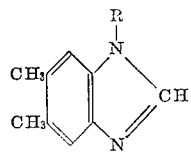

wherein R is a glycosido radical having at least 4 carbon atoms, which comprises heating the sliver salt of 5,6-dimethylbenzimidazole with an acylated halosugar containing at least 4 carbon atoms in an inert organic solvent.

2. The process for preparing N-glycosides of 5,6-dimethylbenzimidazole having the formula:

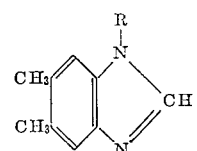

wherein R is a glycosido radical having at least 4 carbon atoms, which comprises heating the silver salt of 5,6-dimethylbenzimidazole with an acylated halosugar containing at least 4 carbon atoms in an inert organic solvent, and subjecting the resulting reaction product to hydrolysis to remove the acyl substituents.

3. The process for preparing 1-L-arabinopyranosido-5,6-dimethylbenzimidazole which comprises heating the silver salt of 5,6-dimethylbenzimidazole with 1-bromo-2,3,4-triacetyl-L-arabinose in an inert organic solvent, and deacetylating the resulting product by hydrolysis.

4. The process for preparing 1-$\beta$-D-glucopyranosido-5,6-dimethylbenzimidazole which comprises heating the silver salt of 5,6-dimethylzimidazole with acetobromoglucose in an inert organic solvent, and deacetylating the resulting product by hydrolysis.

5. The process for preparing 1-L-arabinofuranosido-5,6-dimethylbenzimidazole which comprises heating the silver salt of 5,6-dimethylbenzimidazole with 1-chloro-triacetyl-L-arabinofuranose in an inert solvent, and deacetylating the resulting product by hydrolysis.

FREDERICK W. HOLLY.
CLIFFORD H. SHUNK.
KARL FOLKERS.

References Cited in the file of this patent

UNITED STATES PATENTS

| Number | Name | Date |
|---|---|---|
| 2,522,854 | Brink et al. | Sept. 9, 1950 |

FOREIGN PATENTS

| Number | Country | Date |
|---|---|---|
| 281,008 | Germany | Dec. 10, 1914 |

OTHER REFERENCES

Bamberger et al., Ann. Der Chemie, V. 273 (1893), p. 279–283, 5 pages.

Levene et al., "Nucleic Acids" A. C. S. Monograph 1931, pp. 175–179, 5 pages.

Karrer et al., Helv. Chem Acta, V. 18, Feb. 15, 1935.

Pigman, Carbohydrate Chemistry, published by Academic Press Inc., New York city, page 383 (1948).